United States Patent
McDermott, III et al.

(10) Patent No.: US 9,490,112 B2
(45) Date of Patent: Nov. 8, 2016

(54) SYSTEM AND METHOD FOR CHARACTERIZING IONS USING A SUPERCONDUCTING TRANSMISSION LINE DETECTOR

(71) Applicants: Robert Francis McDermott, III, Madison, WI (US); Joseph Robert Suttle, Madison, WI (US)

(72) Inventors: Robert Francis McDermott, III, Madison, WI (US); Joseph Robert Suttle, Madison, WI (US)

(*) Notice: Subject to any disclaimer, the term of this patent is extended or adjusted under 35 U.S.C. 154(b) by 0 days.

(21) Appl. No.: 14/640,257

(22) Filed: Mar. 6, 2015

(65) Prior Publication Data
US 2016/0260596 A1    Sep. 8, 2016

(51) Int. Cl.
| | | |
|---|---|---|
| *H01J 49/02* | (2006.01) | |
| *H01J 49/40* | (2006.01) | |
| *H01J 49/00* | (2006.01) | |
| *G01J 5/20* | (2006.01) | |
| *G01J 1/44* | (2006.01) | |

(52) U.S. Cl.
CPC .......... *H01J 49/025* (2013.01); *H01J 49/0031* (2013.01); *H01J 49/0036* (2013.01); *H01J 49/022* (2013.01); *H01J 49/40* (2013.01); *G01J 2001/442* (2013.01); *G01J 2005/208* (2013.01)

(58) Field of Classification Search
CPC .............. H01J 49/025; H01J 49/0031; H01J 49/0036; H01J 49/022; H01J 49/40; G01J 2001/442; G01J 2005/208
See application file for complete search history.

(56) References Cited

U.S. PATENT DOCUMENTS

| | | | |
|---|---|---|---|
| 4,935,626 A * | 6/1990 | Schneider | G06F 3/0481 250/336.2 |
| 5,070,241 A | 12/1991 | Jack | |
| 5,097,128 A | 3/1992 | Jack | |
| 7,763,854 B2 * | 7/2010 | Frey | G01J 1/02 250/336.2 |
| 8,575,544 B1 | 11/2013 | Kelly et al. | |
| 2008/0272302 A1* | 11/2008 | Frey | B82Y 20/00 250/336.2 |
| 2012/0077680 A1* | 3/2012 | Berggren | G01J 1/42 505/160 |
| 2013/0172195 A1* | 7/2013 | Bellei | G01J 1/42 505/160 |

(Continued)

FOREIGN PATENT DOCUMENTS

| | | |
|---|---|---|
| EP | 1124129 | 8/2001 |
| EP | 2544216 | 1/2013 |

OTHER PUBLICATIONS

Rosticher, Michael, et al. "A high efficiency superconducting nanowire single electron detector." Applied Physics Letters 97.18 (2010): 183106.*

(Continued)

*Primary Examiner* — Wyatt Stoffa
(74) *Attorney, Agent, or Firm* — Quarles & Brady, LLP

(57) ABSTRACT

A system and method for characterizing incident ions are provided. The method includes positioning a transmission line detector to receive incident ions, the transmission line detector comprising a superconducting meandering wire defining a detection area for incident ions, and applying a bias current to the transmission line detector. The method also includes detecting a first signal produced in the transmission line detector due to an ion impacting the detection area, and detecting a second signal produced in the transmission line detector due to the ion impacting the detection area. The method further includes analyzing the first signal and the second signal to characterize the ion. In some aspects, the method further includes identifying a delay between the first signal and the second signal to determine, using the identified delay, a location of the ion on the detection area.

23 Claims, 11 Drawing Sheets

(56) References Cited

U.S. PATENT DOCUMENTS

2014/0087952 A1* 3/2014 Nam .................. G01J 1/42 505/181
2014/0299751 A1* 10/2014 Tang .................. G01J 1/0425 250/227.11

OTHER PUBLICATIONS

Dauler, Eric A., et al. "Multi-element superconducting nanowire single-photon detector." Applied Superconductivity, IEEE Transactions on 17.2 (2007): 279-284.*

Sclafani, Michele, et al. "Sensitivity of a superconducting nanowire detector for single ions at low energy." Nanotechnology 23.6 (2012): 065501.*

Suzuki, Koji, et al. "Time resolution improvement of superconducting NbN stripline detectors for time-of-flight mass spectrometry." Applied physics express 1.3 (2008): 031702.*

Spieler, VI. Position-Sensitive Detectors, Introduction to Radiation Detectors and Electronics. Jan. 1998, p. 1-22, (url:http://www-physics.lbl.gov/~spieler/physics_198_notes/pdf/VI-PSD.pdf.

International Search Report and Written Opinion of PCT/US2016/020340, mailed May 17, 2016.

* cited by examiner

SYSTEM AND METHOD FOR CHARACTERIZING IONS USING A SUPERCONDUCTING TRANSMISSION LINE DETECTOR

BACKGROUND OF THE INVENTION

The field of the disclosure is related to systems and methods for particle detection. More particularly, the disclosure is directed to systems and methods for ion detection using superconducting circuits.

Atom Probe Tomography ("APT"), a form of destructive time-of-flight ("TOF") microscopy, is a technique in which atoms from a sample of interest are progressively evaporated off using an applied electric field and accelerated towards a detector positioned some distance away. By measuring the arrival time of the ionized atoms at the detector, it is then possible to compute the respective charge-to-mass ratio of the atoms, and identify the species of the atoms. Current atom probe detector technologies are based on a combination of a microchannel plate ("MCP") positioned in front of a delay line anode. Incoming ions from the sample of interest enter capillaries etched in the MCP and impact the walls inside the capillary. Charged particle impacts on the side walls of the capillaries release secondary electrons, which are accelerated down the capillary and continue to generate additional electrons. In this way, the MCP acts as an amplifier, creating a much larger cloud of charges that then exits the backside of the MCP. The charge cloud then impinges upon a delay line anode positioned behind the MCP, generating a measurable signal pulse.

APT has particularly demanding requirements for the detectors. The main weaknesses that need to be addressed include detection efficiency, kinetic energy resolution, multi-hit discernment, and maximum event rate. Multi-hit discernment refers to the situation in which more than one atom evaporates at a time, thus creating two events in the detectors at the same time. With the current MCP and delay line anode readout it is possible to distinguish two hits if they are adequately separated in space and time. However, there is a strong correlation in double evaporation events such that the two ions impact the detector very near each other and at about the same time. This kind of event cannot be distinguished from a single ion event. Addressing detector limitations is critical to the advancement of APT.

In light of the above, there remains a need for efficient ion detectors for use in a variety of applications, including atom probe systems.

SUMMARY OF THE INVENTION

The present disclosure is directed to charged particle detection using superconducting circuits that overcomes the shortcomings of previous technologies. Specifically, a system and method are described for detecting and characterizing incident ions that make use of a novel delay line detector capable of providing positional information and kinetic energy discrimination for impact events. In some aspects, the delay line detector is implemented using substantially extended superconducting transmission lines configured to achieve high efficiency and sensitivity without excessively long recovery times. Such delay line detectors greatly extend achievable detection areas compared to previous detectors, such as superconducting single photon detectors ("SSPDs"), affording use as an imaging element without need for multiplexing.

As will be appreciated, features and capabilities of the present invention are amenable to a wide range of applications. For instance, atom probe systems, utilized in semiconductor research and manufacturing for material analysis and quality control, can benefit from larger area detectors capable of accurate timing information, as well as position resolving power, as facilitated by the herein described delay line detector. In addition, time-of-flight spectroscopy systems, requiring large active areas and accurate timing information to determine the charge-to-mass ratio of ionized particles, may also be appreciably improved using the present invention. In addition, the system and method described would be capable of distinguishing between singly- and doubly-ionized species with the same charge-to-mass ratio and thus the same time-of-flight.

Thus, in accordance with one aspect of the present disclosure, a system for characterizing incident ions is provided. The system includes a transmission line detector comprising a superconducting meandering wire extending between a first end and a second end defining a detection area for the transmission line detector, a dielectric layer proximal to the superconducting meandering wire, and a ground plane separated from the superconducting meandering wire by the dielectric layer. The system also includes a first bias tee coupled to the first end of the superconducting meandering wire, and a second bias tee coupled to the second end of the superconducting meandering wire. The system further includes a control system configured to direct a current source coupled to the first bias tee to apply a bias current to the transmission line detector, detect, using the first bias tee, a first signal produced in the transmission line detector due to an ion impacting the detection area, and detect, using the second bias tee, a second signal produced in the transmission line detector due to the ion impacting the detection area. The control system is also configured to analyze the first signal and the second signal to characterize the ion.

In accordance with another aspect of the present disclosure, a method for characterizing incident ions is provided. The method includes positioning at least one transmission line detector to receive incident ions, the at least one transmission line detector comprising a superconducting meandering wire defining a detection area for incident ions, and applying a bias current to the transmission line detector. The method also includes detecting a first signal produced in the at least one transmission line detector due to an ion impacting the detection area, and detecting a second signal produced in the at least one transmission line detector due to the ion impacting the detection area. The method further includes analyzing the first signal and the second signal to characterize the ion. In some aspects, the method further includes identifying a delay between the first signal and the second signal to determine, using the identified delay, a location of the ion on the detection area.

The foregoing and other aspects and advantages of the invention will appear from the following description. In the description, reference is made to the accompanying drawings that form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION OF THE INVENTION

Figure 1:
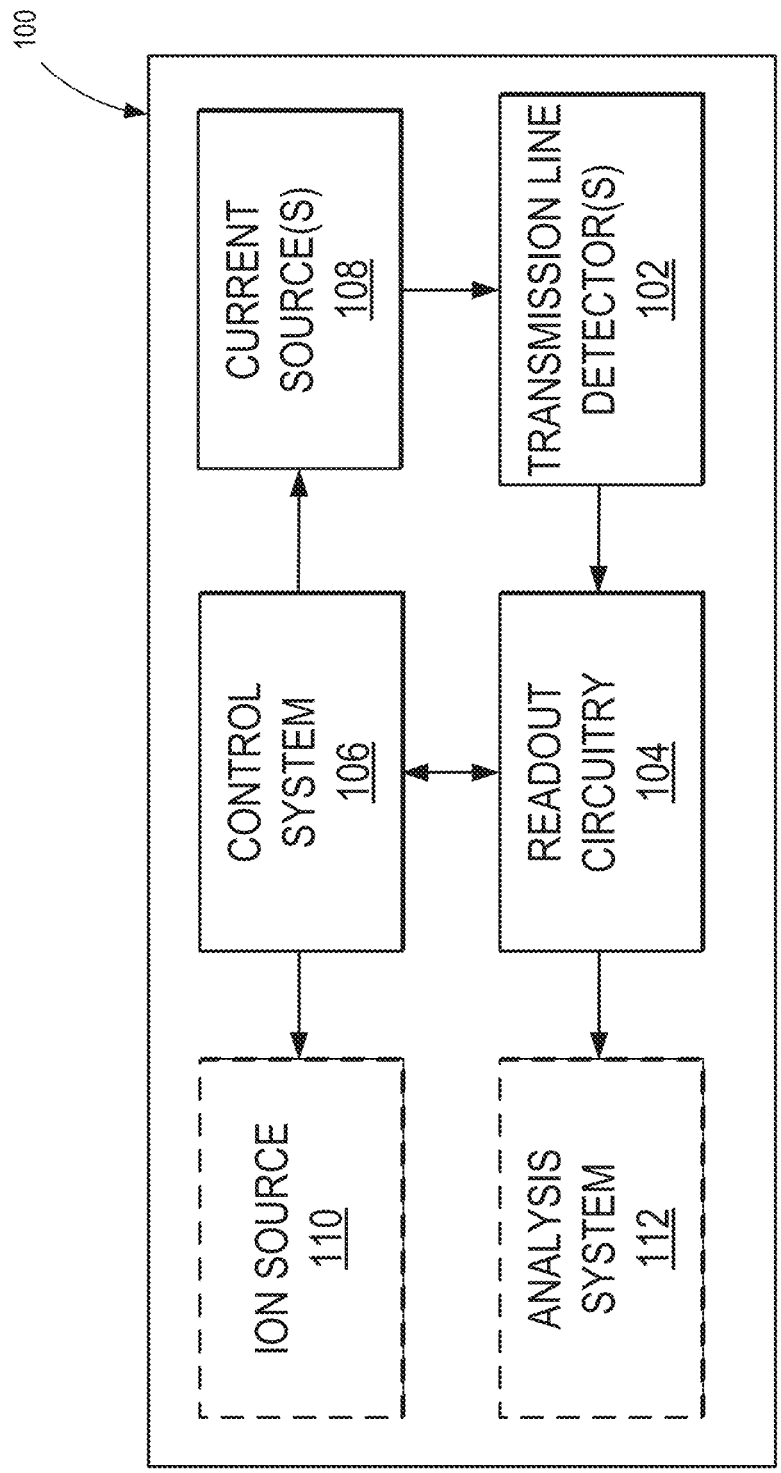
FIG. 1 is a schematic illustration of an example system for characterizing incident ions, in accordance with aspects of the present disclosure.

The present disclosure describes an approach for detecting and characterizing incident ions, using detectors capable of providing positional information and kinetic energy discrimination that overcomes deficiencies of previous technologies. In some aspects, novel superconducting delay line detectors are provided, which utilize substantially extended superconducting transmission lines for detecting ion impact events, in contrast to previously utilized superconducting high-kinetic-inductance nanowires or normal conducting delay lines. As will be appreciated from descriptions below, among other advantages, such superconducting delay line detectors make it possible to scale to any desired active area, and achieve position resolution. For instance, due to the fact that transmission lines have a real, frequency independent impedance, which is determined by the inductance and capacitance per unit length, the dead time of the detector no longer scales with the length. Furthermore, when an ion impact event occurs somewhere in a detector, the voltage output created at that point travels along the transmission line undistorted and with a well defined propagation velocity. This allows accurate reconstruction of positional information for the event.

Atom probe tomography ("APT") systems are systems or devices that allow material specimens to be analyzed on an atomic level. In general, such systems usually include a specimen mount, a local electrode with a small aperture, and a detector. The local electrode is located between the specimen and the detector, and is typically either grounded or negatively charged. During analysis, the specimen is subjected to a positive electrical potential using a baseline or fixed bias voltage. An excitation pulse, such as a positive electrical pulse above the baseline voltage, a laser pulse, or other form of energetic pulse, is then applied to the specimen at regular or irregular time intervals. Alternatively or additionally, a negative electrical pulse can be periodically applied to the local electrode. As a result, individual atoms are occasionally ionized from the tip of the specimen via a mechanism known as "field evaporation." These ions then pass though the small aperture in the local electrode to impact the surface of the detector.

Typical atom probe systems use a microchannel plate ("MCP") coupled to a normal conducting delay line to detect incident ions. Charge clouds, generated due to ion impacts on the MCP, produce measurable signal pulses in the delay line. However, commercially available MCP detectors typically fail to detect numerous ions evaporated from specimens, and tend to operate at about 60% efficiency. The efficiency is limited by a number of factors, including MCP pore density and charging effects. MCP-based detectors also lack energy resolution, and hence fail to distinguish ions with the same charge-to-mass ratio but different masses. Other drawbacks include complicated and expensive processes for manufacturing MCPs, position-dependent distortion, and poor multi-hit discrimination. In addition, signals produced in a normal conducting delay line are subject to resistive dissipation.

Previously, superconducting single photon detectors ("SSPDs"), which are fabricated using thin high-inductance superconducting nanowires, have been adapted for use in time-of-flight ("TOF") spectroscopy applications. Although SSPDs have been shown to have fast, stable timing response necessary for charge-to-mass ratio discrimination, they do not provide positional information of impacting particles. Also, although it is conceivable that large arrays of SSPDs may be constructed, efforts to date have produced implementations that only cover areas of roughly 100 squared microns, several orders of magnitude short of that required for practical use, for example, in APT systems.

Some efforts to increase coverage area have been attempted by connecting multiple SSPDs in series. However, as more detectors are added, the dead time between events increases as well. In order to circumvent this challenge, some researchers have created different combinations of parallel and series detector blocks. Although such approaches have achieved up to a few squared millimeter areas, they provide no possibility for measuring positional information. Furthermore, due to the high inductance of each nanowire in a parallel block there is a non-negligible recovery time for restoring the bias current to a wire after it switches. This leads to a scenario in which pulses coming from different wires can have very different amplitudes depending upon the particular nanowire and its recent detection history. This makes readout more complicated and eliminates any potential for measuring the ion's kinetic energy from the pulse height.

Therefore, in recognizing the shortcomings of current ion detectors, and limitations of single photon detection technologies, the present disclosures introduces a new approach for charged particle detection using superconducting circuits, as will be described.

Turning to FIG. 1, a diagram of an example system 100, in accordance with aspects of the present disclosure, is shown. The system 100 can be an atom probe system, a spectroscopic system, an ion detector/detection system, or any other system intended for or making use of detecting, identifying and/or characterizing incident ions. With reference to FIG. 1, the system 100 can include at least one transmission line detector 102, readout circuitry 104, a control system 106, and at least one current source 108. In some implementations, system 100 can include an ion source 110 and an analysis system 112.

In some preferred embodiments, each transmission line detector 102 can be in the form of superconducting microstrips or striplines shaped and dimensioned in accordance with targeted area coverage, superconducting critical currents, kinetic inductances, energy regime of interest, expected repetition rates, output impedances, and so forth. For instance, a single superconducting transmission line detector 102 may be configured to cover a detection area of up to 1000 squared millimeters, although other values may be possible. In some applications, an increased modularity may be desirable when configuring a detection area, for example, in order to simplify manufacturing, or decrease detector latency. As such, multiple transmission line detectors 102 may be arranged in one or more arrays, or modules, in order to scale to any extended detection area.

Figure 2:
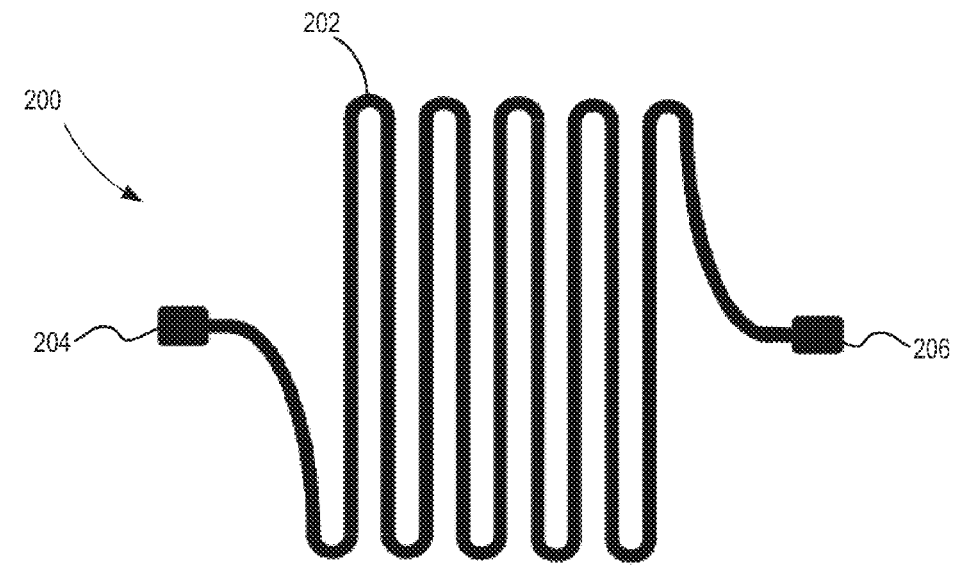
FIG. 2 shows an example of a superconducting transmission line detector, in accordance with aspects of the present disclosure.
Figure 2:
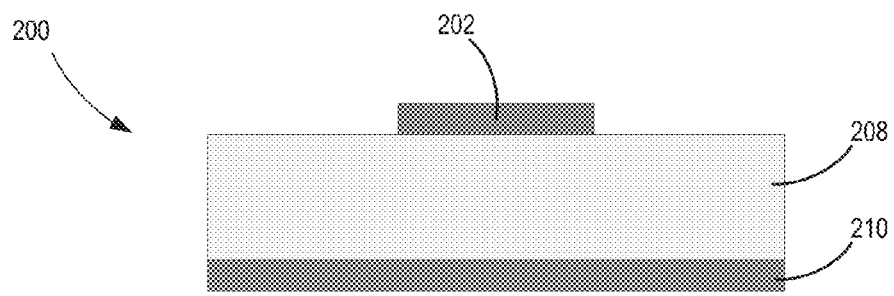

FIG. 2 shows a non-limiting example of a transmission line detector 200, in accordance with aspects of the present disclosure. The transmission line detector 200 includes a superconducting wire 202 extending substantially between a first end 204 and a second end 206. The superconducting transmission line detector 200 also includes a dielectric layer 208 proximal to the superconducting wire 202, and a ground plane 210, which is separated from the superconducting wire 202 by the dielectric layer 208. By way of example, the superconducting wire 202 may have a length up to or on the order of 100 meters, a width in a range between 100 nanometers and 10 micrometers, and a thickness in a range between 5 nanometers and 100 nanometers, although other dimensions can be possible. It may be appreciated, however, that the dimensions and configurations of the superconducting wire 202 may be designed in dependence of the particular application. For instance, the dimensions of the superconducting wire 202 may be selected based upon materials and substrates utilized, desired area coverage, superconducting critical currents, kinetic inductances, energy regime of interest, expected repetition rates, output impedances, and so forth.

In some aspects, the superconducting wire 202 is a meandering wire whose lateral dimensions and inter-wire separation defines the detection area for the superconducting transmission line detector 200, as shown in FIG. 2. In particular, and facilitated by the presence of the ground plane 210, which substantially reduces cross-talk, the separation between parallel portions of the meandering wire, may be less than 1000 nanometers, and more specifically less than 200 nanometers. Although the superconducting wire 202 has been described above with reference to particular implementations, it may be may be appreciated that other configurations and modifications may also be possible.

Figure 3:
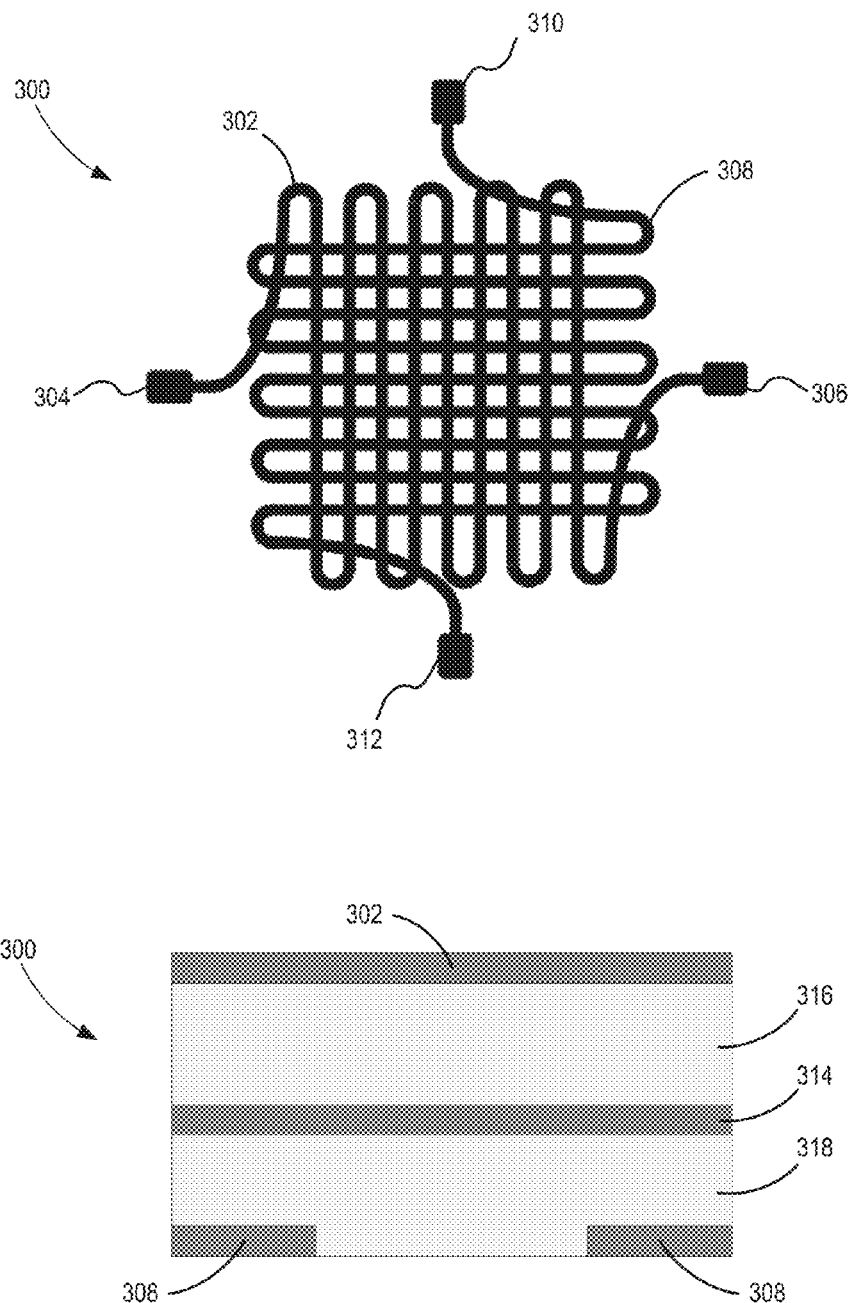
FIG. 3 shows another example of a superconducting transmission line detector, in accordance with aspects of the present disclosure.

FIG. 3 shows another non-limiting example of a transmission line detector 300, in accordance with aspects of the present disclosure. The transmission line detector 300 includes a first superconducting wire 302 extending between a first end 304 and a second end 306, and a second superconducting wire 308 extending between a first end 310 and a second end 312. The transmission line detector 300 also includes a ground plane 314 separated from the first superconducting wire 302 by a first dielectric layer 316, and from the second superconducting wire 308 by second dielectric layer 318. The superior and inferior portions of the ground plane 314 are proximal to the first dielectric layer 316 and the second dielectric layer 318, respectively. As shown in FIG. 3, the first superconducting wire 302 and second superconducting wire 308 can be configured as meandering wires arranged substantially orthogonal to each other, shaped and dimensioned in a manner similar to descriptions provided with reference to FIG. 2.

Standard thin-film fabrication techniques may be utilized to fabricate superconducting transmission line detectors, as described with reference to FIGS. 2 and 3. For example, detectors may be fabricated using niobium films sputtered in a high vacuum system at room temperature, with base vacuum pressures, for example, less than $5 \cdot 10^{-8}$ Torr. The films may then be patterned using optical lithography and subsequently plasma etched, for example in a reactive ion etcher ("RIE") using a $SF_6+O_2$ plasma. Dielectric layers may then be formed using plasma enhanced chemical vapor deposition ("PECVD") for silicon nitride dielectric layers, or RF sputtering for silicon dioxide dielectric layers. These layers may then be patterned using optical lithography, and subsequently etched in the RIE using a $CHF_3+O_2$ plasma to form vias to allow electrical contact to the buried superconducting layer. It may be appreciated by one skilled in the art that other materials, systems and techniques may also be applied to produce detectors, as described.

Returning to FIG. 1, the system 100 also includes readout circuitry 104 coupled to at least one transmission line detector 102. The readout circuitry 104 can include a variety of electrical devices, systems, or components configured to detect, capture, transmit or store particular signals generated in the transmission line detector 102 as a result of ion impact events therein. For instance, the readout circuitry 104 can include a bias tee coupled to each end of a given transmission line detector 102. In some aspects, the readout circuitry 104 may include capabilities of resolving signals corresponding to ion event rates of about 1 MHz, and/or timing resolution less than 10 nS and preferably less than 1 nS. For example, the readout circuitry 104 may include a digitizing oscilloscope.

The system 100 also includes a control system 106 configured to carry out various steps in the operation of system 100. In some aspects, the control system 106 may be configured to direct a current source 108 to apply bias current through the inductive port of a bias tee coupled to a transmission line detector 102. The bias current may be in the form of constant DC current or pulsed current, whose amplitude, timing, and duration may depend upon the desired mode of operation of the detector, as will be described, as well as the energy regime of interest, expected repetition or ion impact rates, superconducting characteristics of the transmission line detector 102, operating temperature and so forth. The control system 106 may also communicate with the readout circuitry 104 to coordinate detection of various signals originating in each transmission line detector 102. In particular, the control system 106 may be configured to control the readout circuitry 104 to detect signals produced in a transmission line detector 102 resulting from ions impacting the detection area. As will be described, the control system 106 may be configured to detect, using a first bias tee coupled to a transmission line detector 102, a first signal produced therein as a result of an ion impact event, and detect, using a second bias tee coupled to a transmission line detector 102, a second signal produced therein. As described, the system 100 can include multiple transmission line detectors, configured as arrays, or modules, covering an extended detection area. As such, the control system 106 may be configured to control each transmission line detector, using respective bias tees, as described.

In some aspects, the control system may be configured to analyze the detected signals to characterize the impacting ions. For instance, the control system 106 may identify a delay between the first signal and the second signal, and determine, using the identified delay, the location along a transmission line detector 102 for the ion impact event. In addition, the control system 106 may analyze the amplitude of signals received, for example, in order to identify the energy of an impacting ion. The control system may further include an output for displaying a report indicating information related to the detected and analyzed signals. For example, the control system 106 may be configured to generate a report in the form of two- or three-dimensional maps or images identifying a specimen's determined constituent atoms, for example, using a color code, as well as their respective origins in the specimen.

The system 100 can optionally include an ion source 110 in communication with the control system 106. In some aspects, the ion source 100 can receive instructions from the control system 106 to generate ions, as desired. By way of example, the ion source 110 can include or be part of an atom probe system, and include capabilities for generating ions from a target material using high voltage and/or laser pulsing. As such, the ion source 110 may be controlled by the control system 106 to apply high voltage and/or laser pulses to a sample material, in order to controllably generate the ions. In other aspects, the ion source 100 can provide data or information, such as pulse timing information, to the control system 106.

The system 100 can also optionally include a separate analysis system 112, in communication with the readout circuitry 104, capable of carrying out a number of data processing or analysis steps. In particular, the analysis system 112 can be in the form of a personal computer, workstation, laptop, tablet, or any other stand-alone or networked computing device, and be configured to receive and process data or information associated with signals acquired by the readout circuitry 104.

In some aspects, the analysis system 112 may be configured to characterize ions detected using the transmission line detector(s) 102. For instance, the elemental identity of a detected ion can be determined by the analysis system 112 using measures of time of flight ("TOF"). Specifically, in an atom probe system, the TOF is the time between a high voltage or laser pulse that liberates the ion from the surface of the specimen and the time the ion arrives on the transmission line detector 102. The velocity of the ions (and thus their TOF) varies based on the mass-to-charge-state ratio of the ionized atom, with lighter and/or more highly charged ions taking less time to reach the detector. Since the TOF of an ion is indicative of the mass-to-charge ratio of the ion, which is in turn indicative of elemental identity, the TOF can help identify the composition of the ionized atom. In addition, the origin of ions on a specimen can be identified by the analysis system 112 using the location of ion impact events on the transmission line detector 102. Hence, using the provided shape of the specimen, the analysis system 112 can reconstruct a map or image of the specimen, on an atom by atom basis, by using TOF and position information obtained as the specimen is evaporated. In some aspects, the analysis system 112 may identify material defects, or inconsistencies in the specimen, for example in the form of impurities, grain boundaries, dislocations, and so forth.

The analysis system 112 may also be configured to generate a report, in any form and to include any information regarding detected and/or characterized incident ions. For instance, the report may be in the form of two- or three-dimensional maps or images identifying a specimen's determined constituent atoms, for example using a color code, as well as their respective origins in the specimen. The report may provide information related to identified defects, or inconsistencies in the specimen, impurities, grain boundaries, dislocations and so forth.

In addition, although not shown in FIG. 1, system 100 can include capabilities for cryogenic cooling, and particularly with respect to the superconducting transmission line detector(s) 102, where desirable temperatures may be as low as 4 Kelvin, although other temperatures may be possible. In addition, capabilities for cooling material specimens, for example, as in the case of an atom probe system, may be desirable for reducing thermal motion at the atomic level that can result in positional errors in the data collected. Specimen temperatures may be on the order of 20 to 50 Kelvin, although other values may be possible.

Figure 4:
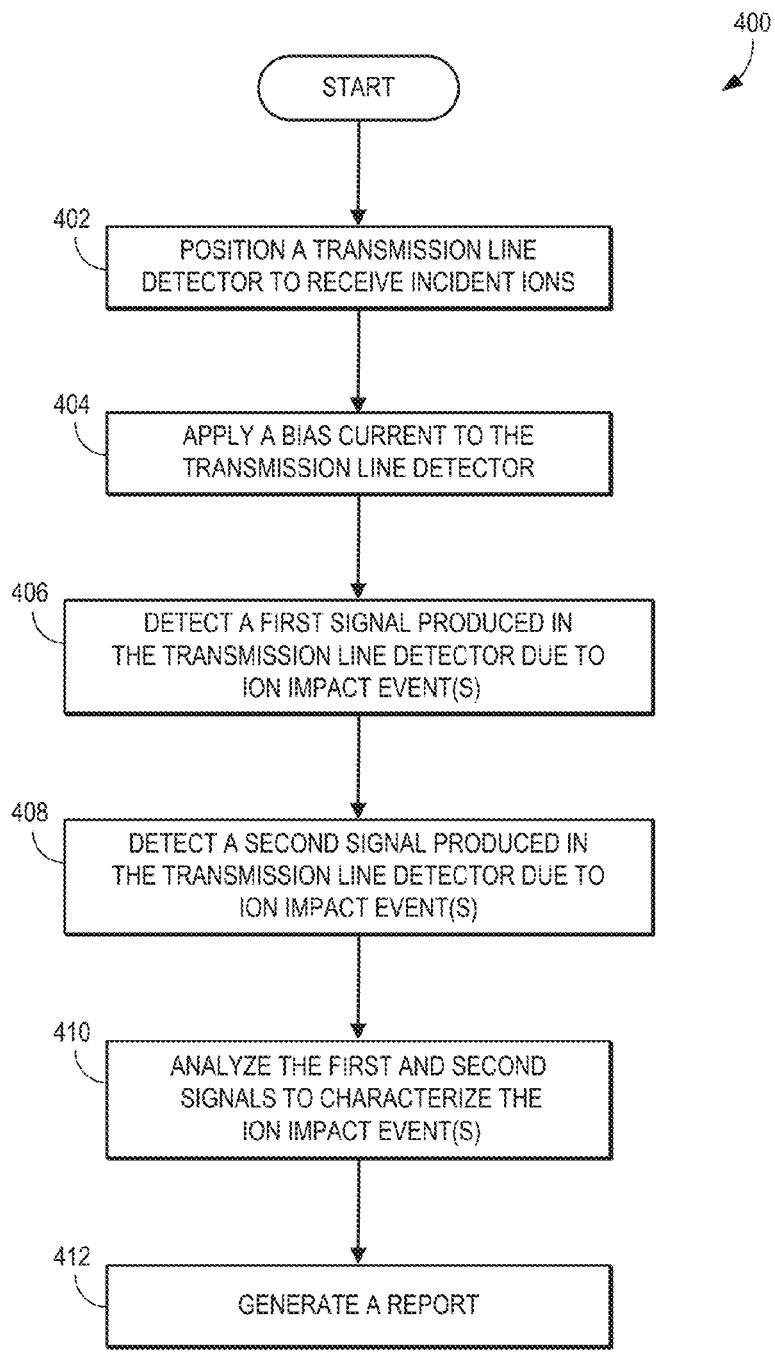
FIG. 4 is a flowchart setting forth steps of a method in accordance with the present disclosure.

Turning to FIG. 4, a flowchart setting forth steps of a process 400 in accordance with aspects of the present disclosure is shown. The process 400, for example, may be carried out using a system, as shown in FIG. 1, and begin by positioning one or more transmission line detectors to receive incident ions, as indicated by process block 402. In some aspects, this may include generating ions using an ion source as described with respect to the system of FIG. 1.

At process block 404, bias currents are applied to the one or more transmission line detectors. In some aspects, the applied bias currents include constant or pulsed currents. As will be described, the bias current applied to each detector may be dependent upon selected mode of operation, ambient temperature conditions, as well as the superconducting properties of the detector, such as the superconducting critical current. In particular, as described below, an avalanche mode of operation refers to a bias current that is high relative to the superconducting critical current, while a linear mode of operation refers to a bias current that is low relative to the critical current. In some aspects, a temperature of the transmission line detector may be selected and controlled based on a targeted superconducting critical current.

Figure 5:
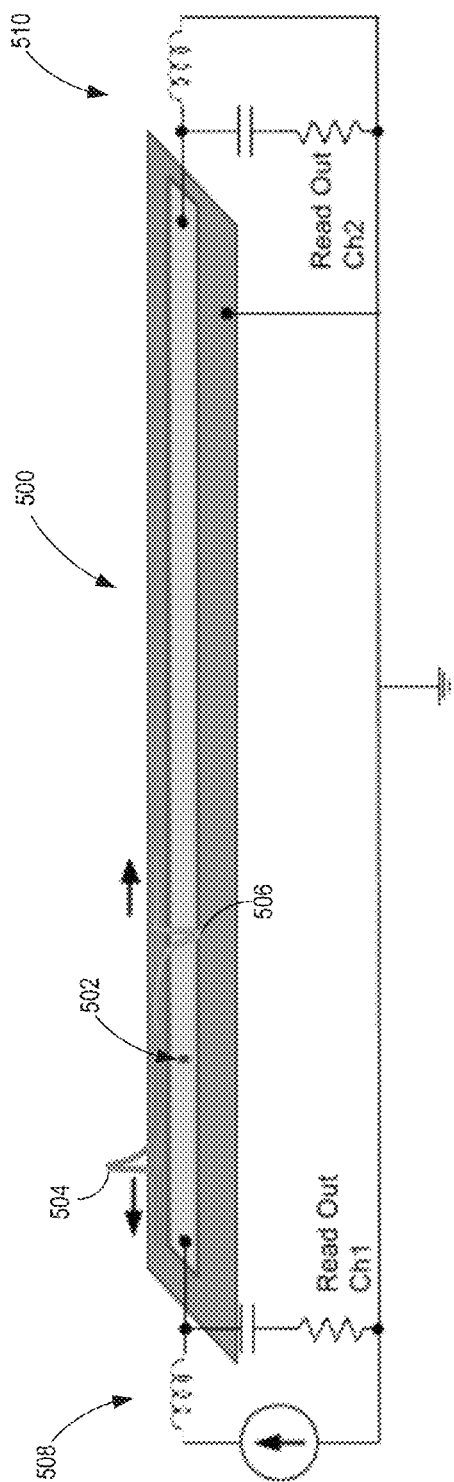
FIG. 5. is a graphical illustration showing a detection mechanism using a superconducting transmission line detector, in accordance with aspects of the present disclosure.

In the absence of detection events, the applied bias current travels along the length of the transmission line detector and into the ground of the circuit. However, when an ion impact event occurs, the properties of the superconducting wire forming the transmission line detector are altered via absorption of the incident ion, which consequently generate measureable outputs as a result of energy deposition therein. This process is visually represented in FIG. 5. Specifically, as shown, an ion impact event 502 occurring at a particular location along a transmission line detector 500 produces two detectable voltage pulses, namely a first signal 504 and a second signal 506, that are of opposite polarity and travel in opposite directions along the transmission line detector 500.

While operating at high bias currents, or in avalanche mode, the ion impact event 502 forms a normal, or resistive, region across transmission line detector 500, wherein superconductivity breaks down. This occurs because the critical current of the normal zone is depressed below the bias current level and the affected portion of transmission line detector 500 reverts to a normal, resistive, conduction. Such discontinuity in the impedance causes a step to form in the current along the transmission line detector 500, which then causes a pair of voltage edges to form. As described, the voltage edges have opposite polarities and travel in opposite directions. In particular, the first signal 504, or positive voltage edge, moves towards a first bias tee 508, which is upstream or proximate to the current bias source, while the second signal 506, or negative voltage edge, travels towards second bias tee 510, or the grounded side of the transmission line detector 500.

Figure 6A:
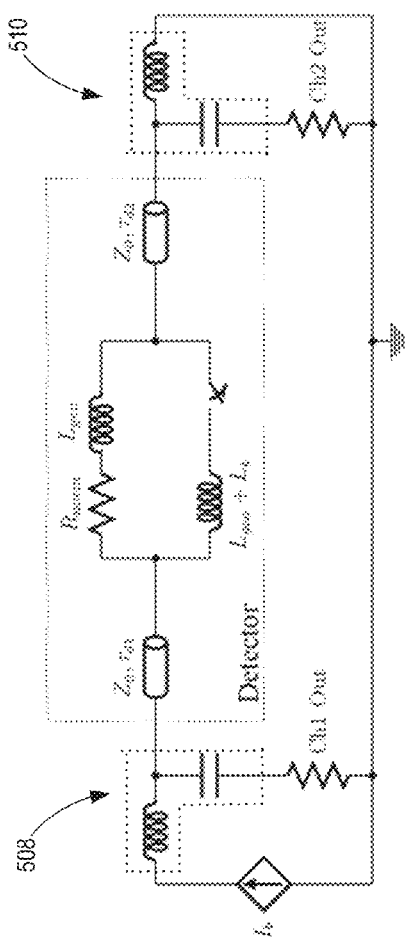
FIG. 6A shows a circuit model for a superconducting transmission line detector operated in avalanche mode, in accordance with aspects of the present disclosure.

FIG. 6A illustrates an equivalent circuit model for operating a transmission line detector in avalanche mode. Using the equivalent circuit, an expected amplitude for the output voltage signals may be obtained as follows:

$$V_{out} = \Delta I \times Z_0 \quad (1)$$

$$V_{out} = I_b \left( \frac{R_N}{R_N + Z_0} \right) \times Z_0 \quad (1)$$

where $I_b$ is the bias current, $Z_0$ is the transmission line impedance and $R_N$ is the resistance of the normal region. The fall time of the pulse may be determined by the recovery time of the normal region. As may be appreciated from the above, each pulse takes a finite time to reach the input port of each bias tee, and hence by measuring the output signals on both the up and downstream sides of the transmission line detector, and comparing the arrival time of the pulses, the position of the ion impact event along the transmission line may be determined. In addition, if the transmission line detector is biased below its retrapping current, the normal region will return to the superconducting state, the current will return to its normal level, and that region will once again be sensitive to events. The measured output will be a pulse whose rise time corresponds to the amount of time it takes for the hot spot to form.

In linear mode, the bias current supplied is low enough so that a resistive region cannot be formed across the transmission line detector as a result of an ion impact event. This is because only a fraction of the Cooper pairs in the detection region are broken, resulting in a small increase in kinetic inductance of that point in the transmission line detector. Nonetheless, it is still possible to measure signals from ion impact events. In addition, the transmission line detector does not have the opportunity to latch, and hence will always self reset.

Figure 6B:
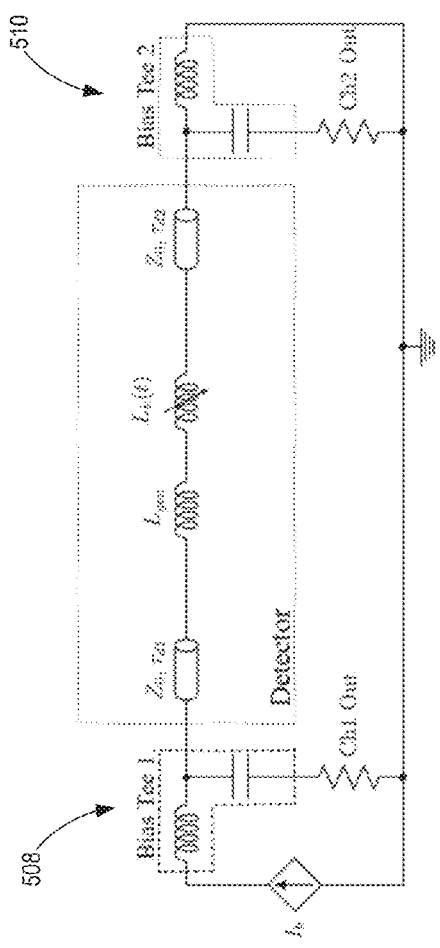
FIG. 6B shows a circuit model for a superconducting transmission line detector operated in linear mode, in accordance with aspects of the present disclosure.

This may be appreciated by examining an equivalent circuit model shown in FIG. 6B. In particular, in the limit of a fast inductance change, and a small change in inductance, namely $\Delta L \ll L$, the amplitude of a voltage pulse in this scenario may be obtained using the following equation:

$$V_{out} \approx I_b Z_0 \frac{\Delta L}{L} \quad (2)$$

As appreciated from the above, the amplitude (and thus the signal-to-noise ratio) can be much smaller in linear mode because, the change in kinetic inductance is quite small, even for high energy particles. However, because the kinetic inductance is related to the density of remaining Cooper pairs in the detection region, it is possible to measure the number of Cooper pairs broken by the event. This allows determination of the kinetic energy for the detected ion.

Hence, referring again to FIG. 4, the first signal and second signal produced in the transmission line detector due to an ion impact event are detected, via bias tees connected thereto, as indicated by process blocks 406 and 408. As described above, the exact mechanics of this detection may depend upon the bias regime selected. In some aspects, detection of the first and second signal may be correlated with operation of an ion source, for example, as found in an atom probe device or system.

Then, at process block 410, the detected first and second signals are analyzed to characterize the ion impact event(s). In particular, the duration of travel, the relative delay, as well as the amplitude of each detected signal may be used to determine the identity of the incident ion, the location of the ion impact, as well as the energy of the ion. Then, at process block 412 a report may be generated indicative of the characterized ion impact event(s). As described, in some aspects, the report may include two- or three-dimensional maps or images identifying a specimen's determined constituent atoms, for example, using a color code, as well as their respective origins in the specimen.

By way of example, a demonstration of transmission line detectors, fabricated and configured in accordance with the present disclosure, was performed. First, the detectors were screened by performing electrical measurements in a liquid helium dewar. After confirming that the detector layer was superconducting, and well isolated from the ground plane at all points, its critical current density, Jc, was measured and compared to short, on-chip superconducting test wires. For devices with high enough Jc, a Time Domain Reflectometry measurement was performed on the detector to confirm its proper operation and extract its total propagation delay and characteristic impedance. Once a detector passed these screening procedures, it was loaded onto the cold stage of a pulse-tube cryocooler. A source of energetic particles, comprising Americium-241 as a source of alpha particles, was installed facing the detector to provide ion impact events for measurement. The detector was then cooled down to the base temperature of approximately 3 Kelvin. A bias current was supplied through the DC port of a first bias-tee connected to the transmission line detector. The path of the applied bias current then followed the transmission line detector, through the DC port of the second bias-tee connected to the transmission line detector, and into ground. Voltage signals corresponding to ion impact events were read out through the RF ports on each of two bias-tees, which were amplified using room temperature amplifiers to obtain a gain of 45 dB in the range of 20-6000 MHz using commercially available amplifiers. The amplified pulses were then recorded by a digital oscilloscope having a single shot bandwidth of 3 GHz. All pulse outputs were stored for later analysis.

Figure 7:
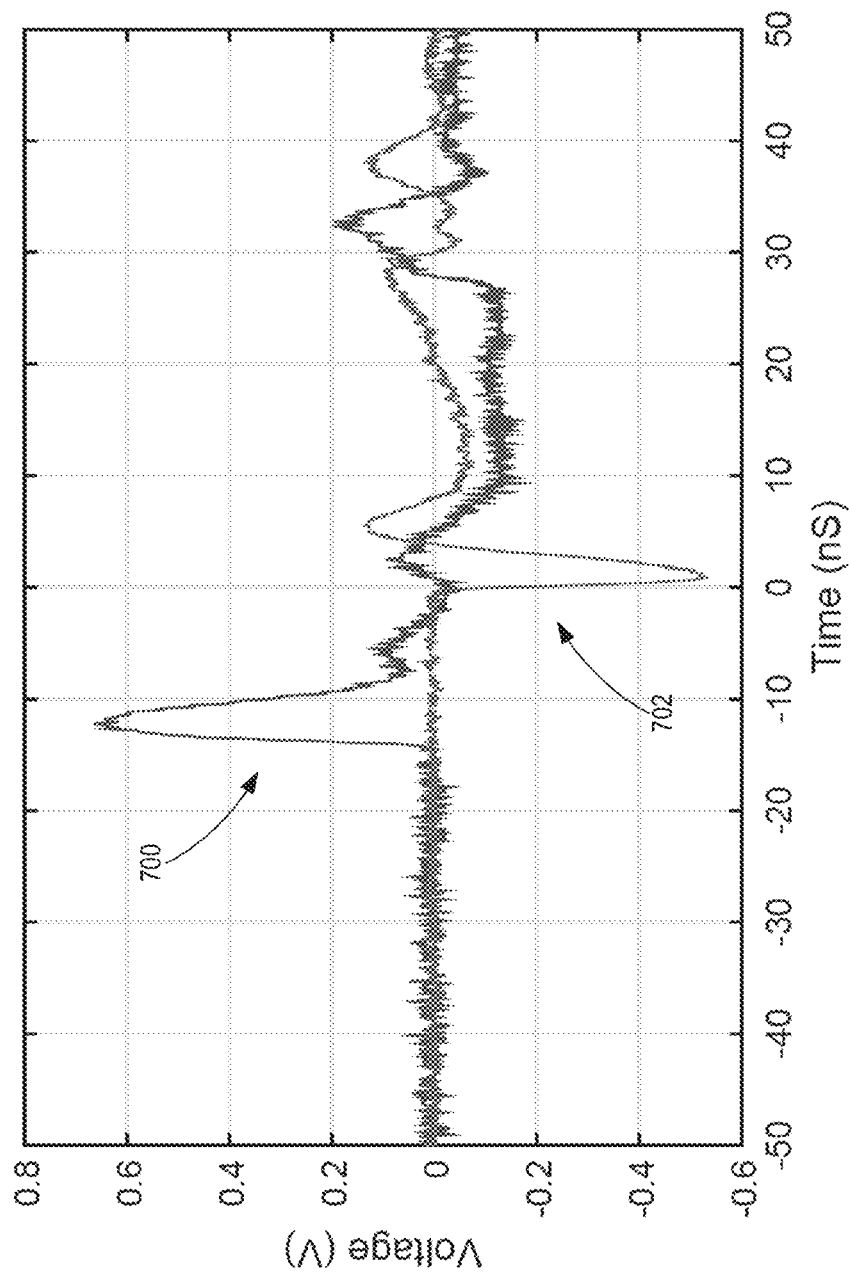
FIG. 7 shows single shot signal outputs obtained from a superconducting transmission line detector operated in avalanche mode, in accordance with aspects of the present disclosure
Figure 8:
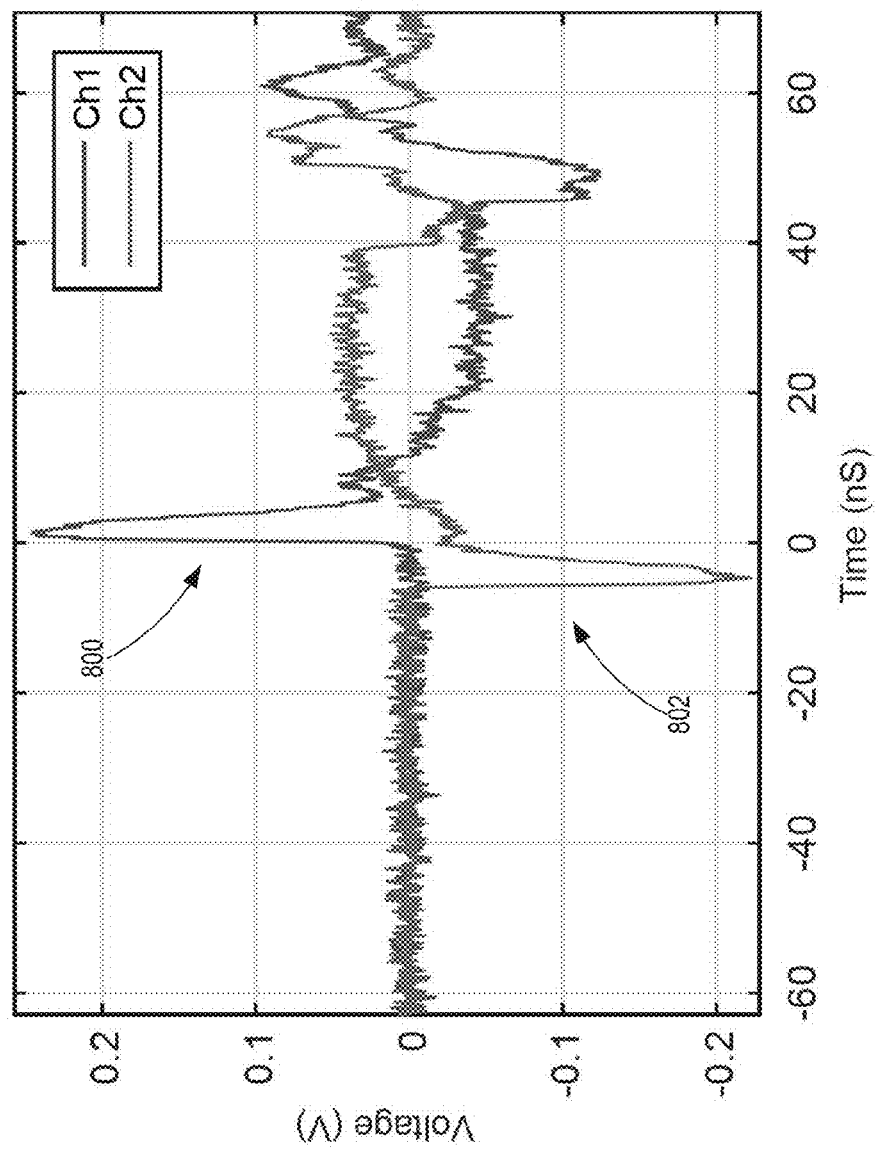
FIG. 8 shows single shot signal outputs obtained from a superconducting transmission line detector operated in linear mode, in accordance with aspects of the present disclosure.

The detectors were able to reliably detect alpha particles from the Americium-241 source in the temperature range between 2.9 and 7.6 Kelvin. In particular, as shown in the example of FIGS. 7 and 8, measured pulse signals exhibited fast rise times, roughly about 1 nanosecond. In avalanche mode, amplified outputs resulted in positive 700 and negative 702 signals of more than half a volt, as shown in FIG. 7. In linear mode, positive 800 and negative 802 signals were smaller by a factor of about 5, as shown in FIG. 8. In both cases, the signal-to-noise ratio ("SNR") was excellent, allowing sensitive discrimination each pulse edge.

Figure 9:
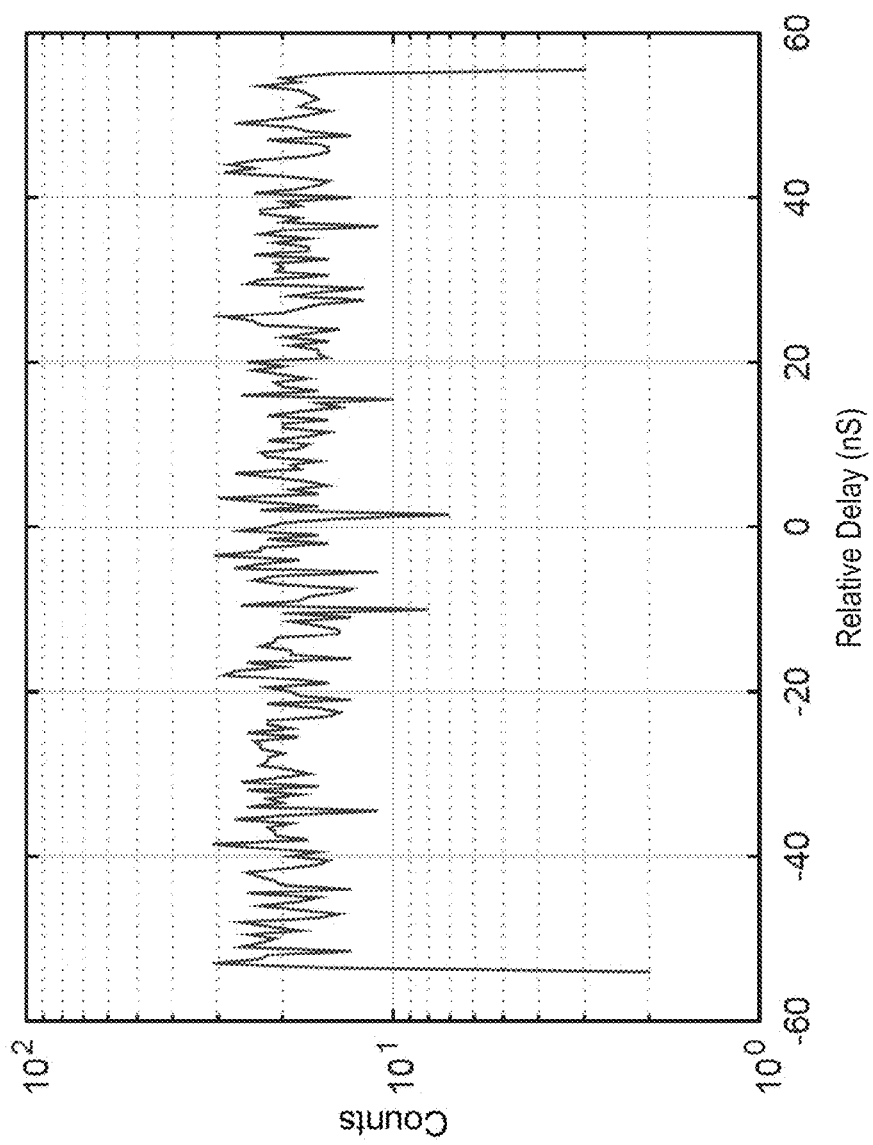
FIG. 9 is a histogram of delay times between signal outputs generated using a superconducting transmission line detector irradiated using an alpha particle source.

In order to determine the distribution of ion impact event positions along the transmission line detector, the relative delay between the pulses, measured using respective bias tees, was computed. FIG. 9 shows a histogram of such relative delay measurements. In this experiment the detector was irradiated with a homogeneous flux of alpha particles. Hence, the expected result was a flat distribution across the length of the transmission line detector, with no stray points outside of the expected range of twice the propagation delay.

Indeed, this was observed, as shown in FIG. 9, verifying that the entire transmission line detector was operating correctly, with no dead spots or variation in sensitivity.

Figure 10:
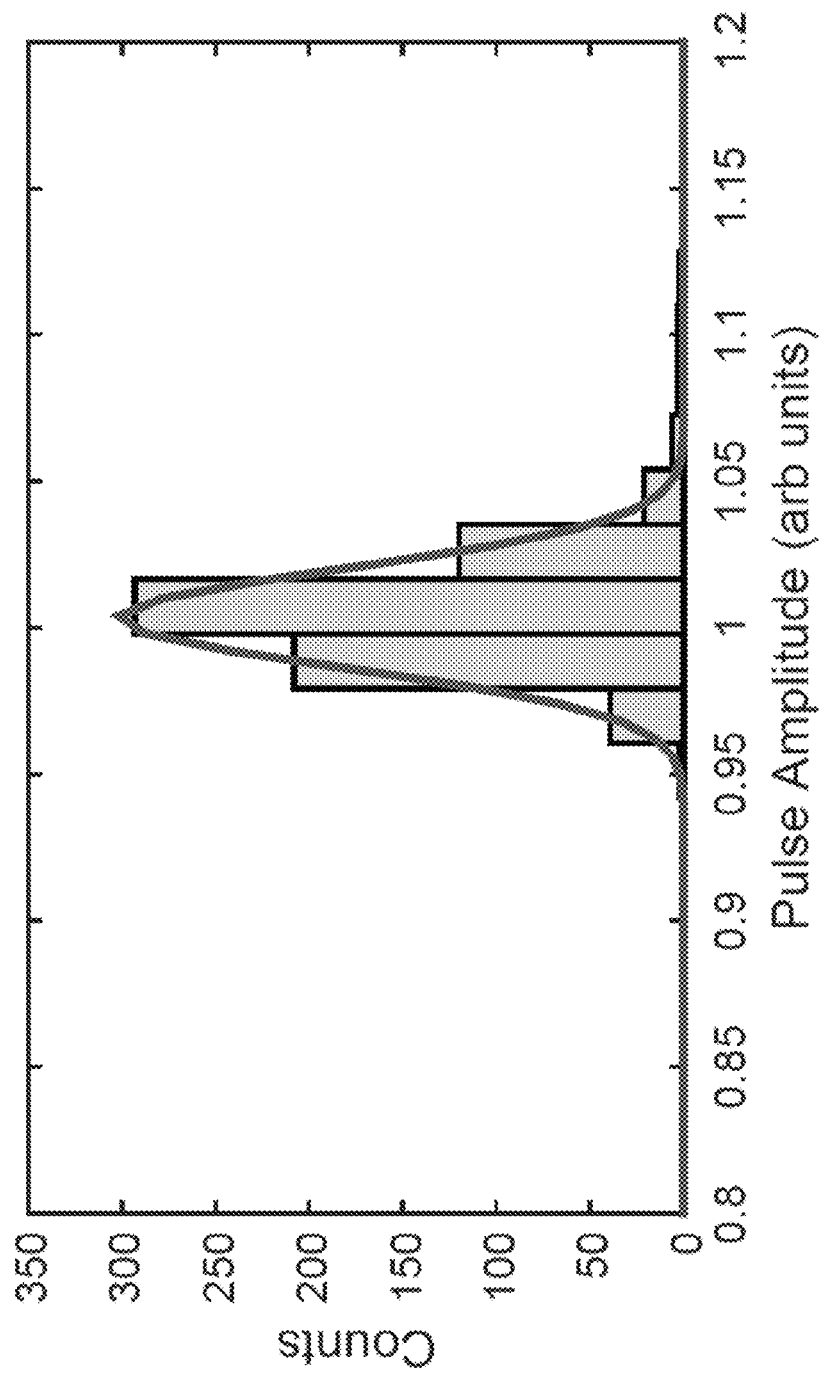
FIG. 10 is a distribution of signal amplitudes generated using a superconducting transmission line detector operated in avalanche mode, in accordance with aspects of the present disclosure.

Another important consideration included the distribution of pulse heights produced by the transmission line detector. When working in avalanche mode, this distribution was expected and verified to be quite narrow, as shown in FIG. 10. With a tighter distribution of amplitudes, read-out electronics can more accurately and reliably pinpoint the timing of pulse arrivals. Furthermore, because the transmission line detector included a superconducting wire, low loss was expected. This means that the amplitude of each pulse should not change appreciably as it travels along the transmission line of the detector. That is, the amplitudes and relative delays should not be strongly correlated, as verified by observation. This represents a large improvement over existing delay line anode technology, which introduces significant distortions and losses so that an event originating on one side of the detector looks completely different from an event on the other side.

Figure 11:
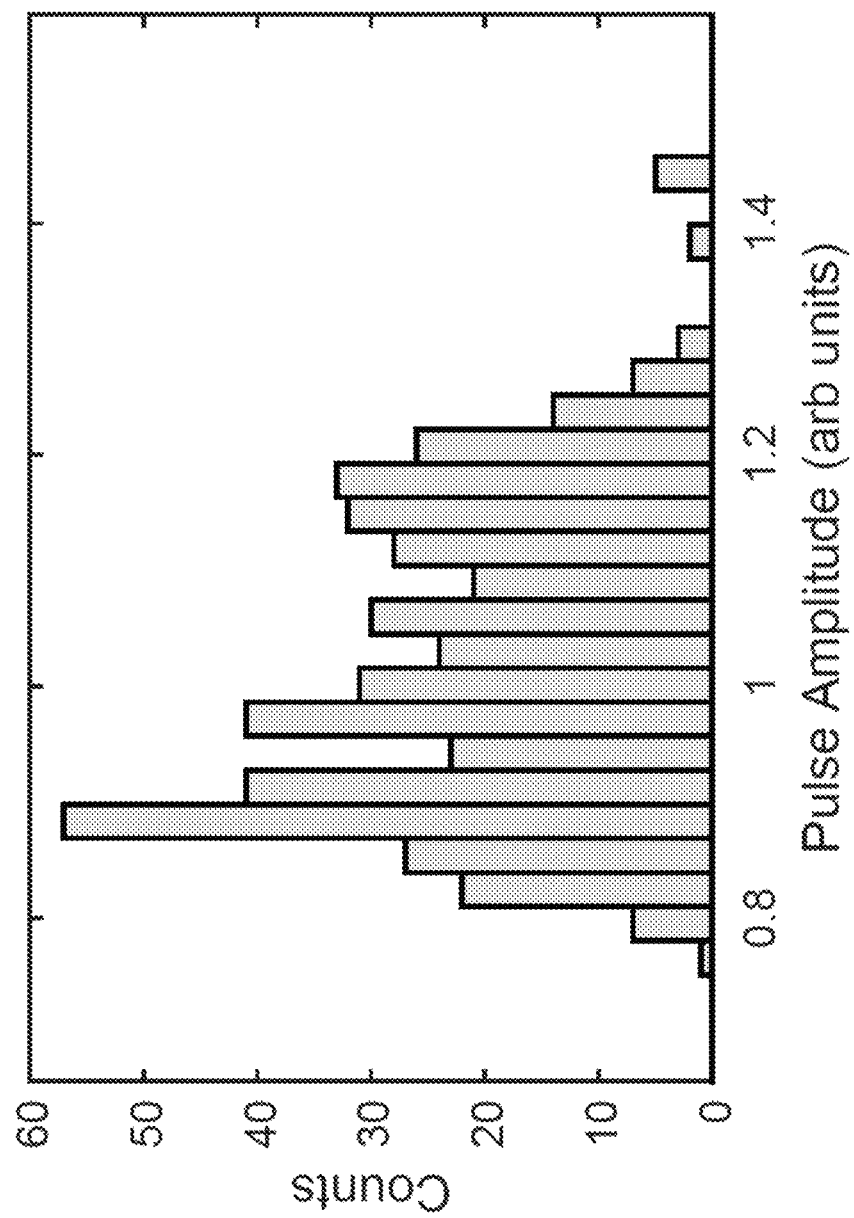
FIG. 11 is a distribution of signal amplitudes generated using a superconducting transmission line detector operated in linear mode, in accordance with aspects of the present disclosure.

In linear mode, the distribution of pulse amplitudes was observed to broaden significantly, as illustrated in FIG. 11. This was expected due to the fact that the pulse heights can vary with the amount of energy deposited into the transmission line detector. Although the particle source utilized was relatively monochromatic, the transmission line detector tested included separations between its meanders. Therefore, different amounts of energy likely were deposited in the detector depending upon the location of the particle impact. Again, the amplitude of pulse outputs was not strongly correlated with the relative delay, as observed in avalanche mode. This is extremely useful as it indicates that the signal amplitude is only affected by the incident kinetic energy and not by position dependent distortions or losses from the transmission line detector.

The present invention has been described in terms of one or more preferred embodiments, and it should be appreciated that many equivalents, alternatives, variations, and modifications, aside from those expressly stated, are possible and within the scope of the invention.

The invention claimed is:

1. A system for characterizing incident ions, the system comprising:
   a transmission line detector comprising:
      a superconducting meandering wire extending between a first end and a second end defining a detection area for the transmission line detector;
      a dielectric layer proximal to the superconducting meandering wire;
      a ground plane separated from the superconducting meandering wire by the dielectric layer,
   a first bias tee coupled to the first end of the superconducting meandering wire;
   a second bias tee coupled to the second end of the superconducting meandering wire; and
   a control system configured to:
      i. direct a current source coupled to the first bias tee to apply a bias current to the transmission line detector;
      ii. detect, using the first bias tee, a first signal produced in the transmission line detector due to an ion impacting the detection area;
      iii. detect, using the second bias tee, a second signal produced in the transmission line detector due to the ion impacting the detection area;
      iv. analyze the first signal and the second signal to characterize the ion.

2. The transmission line detector of claim 1, wherein a distance between the first and second end is up to about 100 meters.

3. The transmission line detector of claim 1, wherein a separation between parallel portions of the superconducting meandering wire is less than about 1000 nanometers.

4. The transmission line detector of claim 1, wherein the detection area includes an area up to about 1000 squared millimeters.

5. The transmission line detector of claim 1 further comprising another superconducting meandering wire arranged substantially orthogonal to the superconducting meandering wire, and separated from the ground plane by another dielectric layer.

6. The transmission line detector of claim 5, wherein the control system is further configured to carry out steps i) through iv) for the another superconducting wire.

7. The transmission line detector of claim 1, wherein the bias current is one of a constant current or a pulsed current.

8. The transmission line detector of claim 1, wherein the bias current is sufficient to generate a resistive region across the superconducting meandering wire as a result of the ion impacting the detection area.

9. The transmission line detector of claim 1, wherein the bias current is not sufficient to generate a resistive region across the superconducting meandering wire as a result of the ion impacting the detection area.

10. The transmission line detector of claim 1, wherein the control system is further configured to identify a relative delay between the first signal and the second signal.

11. The transmission line detector of claim 10, wherein the control system is further configured to determine a location for the ion impact event using the identified relative delay.

12. The transmission line detector of claim 1, wherein the control system is further configured to analyze amplitudes of the first signal and second signal to identify an energy of the ion impacting the detection area.

13. The transmission line detector of claim 1, wherein the control system is further configured to generate a map indicating multiple characterized ions using a color code.

14. The system of claim 1, the system further comprising multiple transmission line detectors and respective bias tees, the transmission line detectors being controllable using the control system and configured to cover an extended detection area.

15. A method for characterizing incident ions, the method comprising:
   i) positioning at least one transmission line detector to receive incident ions, the transmission line detector comprising a superconducting meandering wire that defines a detection area for incident ions;
   ii) applying a bias current to the at least one transmission line detector;
   iii) detecting a first signal produced in the at least one transmission line detector due to an ion impacting the detection area;
   iv) detecting a second signal produced in the at least one transmission line detector due to the ion impacting the detection area; and
   v) analyzing the first signal and the second signal to characterize the ion.

16. The method of claim 15, wherein a separation between parallel portions of the superconducting meandering wire is less than about 1000 nanometers.

17. The method of claim 15, wherein the detection area includes an area up to about 1000 squared millimeters.

18. The method of claim 15, wherein the bias current is one of a constant current or a pulsed current.

19. The method of claim 15, wherein the bias current is sufficient to generate a resistive region across the superconducting meandering wire as a result of the ion impacting the detection area.

20. The method of claim 15, wherein the bias current is not sufficient to generate a resistive region across the superconducting meandering wire as a result of the ion impacting the detection area.

21. The method of claim 15, further comprising determining a location for the ion impact event by identifying a relative delay between the first signal and the second signal.

22. The method of claim 15, further comprising analyzing amplitudes of the first signal and second signal to identify an energy of the ion impacting the detection area.

23. The method of claim 15, further comprising generating a map indicating multiple characterized ions using a color code.

* * * * *